Patented Dec. 20, 1949

2,491,761

UNITED STATES PATENT OFFICE 2,491,761

METHOD OF PRODUCING SILICA FIBERS AND FIBROUS ARTICLES PRODUCED THEREBY

Leon Parker, Glendale, and Alexander Cole, La Habra, Calif., assignors to The H. I. Thompson Company, Los Angeles, Calif., a corporation of California No Drawing. Application May 11, 1946, Serial No. 669,098

16 Claims. (Cl. 41—42)

1

Glass fibers in woven, mat or batt form have been used as insulating material. The relatively low melting point of glass fibers, normally below about 1400° F., and their relatively high coefficient of expansion have made them less suitable for insulation at temperatures of above about 1000° F., and limited their utility to lower temperature insulation service.

For many uses when the fibers are exposed to acid, and particularly to acids at high temperature, a material decomposition of the glass fiber results. The fibers may even be disintegrated by the acid attack, especially in the presence of mechanical forces arising from motion or shock, or even continued expansion and contraction of the glass fiber structure.

We have found that we may convert the glass fiber filament into a high silica filament by extracting therefrom the monovalent, divalent, and trivalent glass-forming metal oxide constituents to leave a filament composed essentially of silica and containing a ratio of less than 10 parts of such metal oxides to 90 parts of $SiO_2$ and even as low as 1 or 2 parts of such oxides, the remaining oxide portion being $SiO_2$. We have discovered that by so doing we can produce a silica filament having a melting point in excess of 1900° F., and in fact we have been able to produce filaments having softening points in excess of 2000° F. and melting points in excess of 3000° F.

We accomplish this result by leaching the fibers, either in loose masses, in batt, mat, cord, woven, or other fabricated form with acids, other than HF or phosphoric acid, which attack $SiO_2$, for a time and at a temperature sufficient to extract substantially all of the oxides other than silica. The treated fibers are then washed substantially free of acid and may be heated at an elevated temperature to dehydrate and shrink the fibers. The above process results in shrinkage of fibers both in diameter and longitudinally.

While the tear strength of woven fiber is reduced by the treatment, the resulting woven fabric of silica fibers is still of considerable strength. In treating fibers according to our process, the initial stage of the treatment with acids results in the formation of a brittle fiber structure. The fibers must be handled carefully. This difficulty is particularly pronounced in treating bulk or batted fibers. The batt and bulk fibers get quite mushy and distorted and the fibers become quite brittle.

We have found that in treating fibers, particularly when in batt form, the fibers should preferably be coated with a resin coating and bonding material which is not disintegrated by the hot acids employed in our process.

Thus, in producing batted silica fibers according to our process, we preferably use batts which are formed from fibers which are coated during the process of batt formation with a resin binding such as the so-called phenolic resins. Such batts have been made in the past for other uses and are a regular commercial article.

The resins employed are well known and usually considered to be acid resistant, water impervious resin coating compositions. We have found, however, that the films with which the fibers are coated do not constitute a barrier to the penetration of acid or the diffusion of the salts formed on leaching. The fibers are leached without destruction of the bonding resin films. These films act as a protective coating to increase the strength and reduce the brittleness of the fibers and the batts and also preserve the shape of the batt during treatment.

Various resins may be employed as bonding agents. Thus, the following resins have excellent acid resistant properties: phenol-formaldehyde; phenol-furfural; polyvinyl chloride; vinylidene chloride; polystyrene; polyethylene; and polybutylene; methylmethacrylate; lignin and rubber and chlorinated rubber. Of the above resins, the phenol-formaldehyde, phenol-furfural, methylmethacrylate resins are attacked by the strong oxidizing acids, such as strong sulfuric acid and strong nitric acid, while the others are not so attacked. The permeability of the resin film to water is greatest in the case of the phenol-formaldehyde, phenol-furfural, and methylmethacrylate resin, and least in the case of the polyvinyl chloride, vinylidene chloride, polystyrene, polyethylene, and the rubbers. We prefer, therefore, in order to cut down the time of leaching, to employ the acid resistant and highly permeable resins, such as the phenol-formaldehyde, phenol-furfural, and methylmethacrylate resins, and employ the non-oxidizing acids when using such resins.

Such resins are dispersed either in water or in organic solvents, as is conventional, and employed as a spray over the glass fibers during the batting process in the manner now commercially employed.

Such batts are immersed in acids and heated, if desired, to accelerate the leaching of the glass. Depending on the nature of the plastic and the glass composition, we may employ any active acids, either organic or inorganic, which will react with the glass-forming oxides other than $SiO_2$, as, for example HCl, $H_2SO_4$, $HNO_3$, acetic, chloroacetic, chlorinated low molecular weight fatty acids, for example, trichloroacetic acid. In the case of high lime glasses, we prefer to use HCl or $HNO_3$, since the resultant chloride and nitrate are soluble in the acid, whereas acids forming insoluble salts of calcium, such as $H_2SO_4$, the calcium salt may be deposited to interfere with the progress of the leaching or the subsequent washing.

The strength of the acid may be varied over a wide range from .1 N to 5 N or higher. We desire to employ as strong an acid as is convenient. However, the acid, if too concentrated, may be of too high viscosity to permit ready diffusion through the resin binder and into and out of the glass; whereas acids which are too weak prolong the time of leaching excessively.

We prefer to operate at an elevated temperature ranging from 100° F. up to the boiling point of the acid. The higher the temperature the more rapid the leaching. We may go above the boiling point of the acid by conducting the leaching in an autoclave under superatmospheric pressure.

The following examples are intended to illustrate our process and the products produced thereby and are not intended as any limitation thereof.

Example 1

"ECC-11 Fiberglas Tape" manufactured by the Owens-Corning Fiberglas Corporation, formed of type E glass, which has a softening point of about 1100° F. and a melting point of about 1400° F., more completely identified in Examples 8, 9, and 11, was immersed in a solution of 10% HCl (initial concentration) for 20 minutes at a temperature of 125° F. The tape was then removed from the solution and dried. The tape melted at a temperature above 1900° F.

Example 2

Various samples of the above tape were each immersed in an HCl solution of 23% initial concentration at 125° F. for the following times, and each sample, after exposure for the specified period, was washed. It will be seen that the melting point of the glass fiber depends on the time of leaching and may be raised above 2000° F. Thus, when leached for a time of 30 minutes or less the melting point is somewhat less than 1950° F., and if leached for a time greater than about 40 minutes, it becomes more than 2000° F.

Example 3

Various samples of the above tape were each exposed for 10 minutes in an acid of 10% initial concentration and treated at various temperatures. The melting point of the tapes treated at a temperature of 170° F. or less was less than 1950° F., while the sample exposed to the boiling acid was above 1950° F.

Example 4

The above tape was leached at room temperature with trichloracetic acid solution in water (10% by weight of acid) for 20 hours and the melting point of the glass was raised to 1700° F. and when leached with acid of this strength for 90 hours the melting point of the glass was raised to 2000° F. By increasing the concentration of the acid to 20% by weight the leaching rate is increased. Thus, an acid of this strength raised the melting point to 1700° F. after leaching for 30 minutes at room temperature.

Example 5

E type glass fibers in bulk were treated with acid of initial concentration of 10% at a temperature of 140° F. for 30 minutes. The fibers, after washing and drying, had a melting point over 2000° F.

Example 6

Glass cloth manufactured by the Owens-Corning Fiberglas Corporation (type ECC-164 formed of type E glass) was immersed in 10% HCl acid (initial concentration) and leached at atmospheric temperature for 48 hours. The cloth was washed acid free and air dried. The leached glass had a melting point in excess of 2500° F.

The glass after leaching and air drying was subjected to test method A. S. T. M. D-579-44 to determine its breaking strength. Another sample of the same leached glass cloth (measuring 18" long and 4" wide) was heated to 1700° F. for 10 minutes and the shrinkage determined. Another sample of the same treated cloth was heated to 2000° F. for 5 minutes and its breaking strength determined by the above test. The results were as follows:

|  | Breaking Strength | |
|---|---|---|
|  | Leached and Dried | Leached and Fired |
| Warp | 39.8 | 32.4 |
| Filling | 35.8 | 27.6 |

|  | Shrinkage, percent |
|---|---|
| Warp | 11.4 |
| Filling | 12.1 |

Example 7

A sample of the above cloth was leached with acid of 10% initial concentration at a temperature of 140° F. for 40 minutes and washed free of acid and air dried. It was tested for breaking strength according to the above test procedure and gave the following average values: warp, 34 pounds; filling, 36 pounds.

A sample, 18" long, 4" wide, was heated at 1700° F. for 10 minutes and shrunk as follows: warp shrinkage 10%; filler shrinkage 8-9%.

The air dried sample was heated to 2000° F. for 5 minutes and tested as above and gave the following average breaking strengths: warp, 18 pounds; filling, 16 pounds.

The cloth had a melting point in excess of 2500° F.

Example 8

10.638 grams of E grade glass fibers containing no resin coating were mixed with a 10.6% solution of HCl (113.2 grams of HCl per liter) for 20 minutes at 140° F. with frequent stirring. At the end of the 20 minutes the fibers were removed and washed with water until the water was acid free. The residual acid concentration after removal of the glass was 10.5% (110 grams of HCl per liter). The washed glass sample was air dried to constant weight (air dried for 2 days at 100° F.). The sample (protected against gain of moisture) had a weight of 7.280 grams. 5.020 grams of the air dried sample (protected against moisture gain) were then heated to 1700° F. for 1 hour and cooled in a desiccator and weighed. It weighed 4.439 grams, showing a loss of 11.2%. These tests show that 11.2% of the 7.280 grams of the air dried sample was water of hydration and sorbed moisture, so that the glass fraction weighed 6.41 grams. The leaching therefore caused an extraction of 10.64−6.41=4.23 grams or about 40%, and a hydration to the extent of 11.2% of the leached sample. It is of interest to note that the fiber diameters (measured microscopically) of the air dried sample were substantially the same as that of the unleached sample.

Examination of 10 samples gave the following results:

|  | Original | Leached, Air dried | Leached, Fired |
|---|---|---|---|
|  | Inch | Inch | Inch |
| Maximum fiber diameter | .00033 | .00032 | .00031 |
| Minimum fiber diameter | .00019 | .00022 | .00016 |
| Average fiber diameter | .00027 | .00028 | .00024 |

The distribution of fiber diameter in the three stages of the treatment was as follows:

| Diameters | Original Fibers | Leached, Dried | Fired |
|---|---|---|---|
|  | Per cent | Per cent | Per cent |
| Below .00019″ | 10 | --- | 10 |
| Between .0002 and .00026″ | 30 | 50 | 70 |
| Between .00027 and .00031″ | 60 | 50 | 20 |

This indicates some evidence of reduction in the fiber diameter. The accuracy of the measurement is not in excess of ±.00001″. The fibers produced are, under the microscope, clear, straight, and transparent filaments, showing a curious and as yet unexplained thread-like marking around the filament which is a perfect helix having a uniform pitch along all fibers of .00014″.

In treating such fibers, when in batt form, by the above process, the batt becomes mushy, lumpy, and disintegrates, and the fibers tend to break up in the handling of the batt in the treatment, washing, drying, and firing. When the batts are intended for insulation use, it is desirable that the original shape of the batt be preserved during treatment.

Since, also, the resulting quality of the batt depends in part on the maintenance of the porosity of the batt, the fragmentation of the fibers not only weakens the batt mechanically, but impairs its insulating quality.

In employing the improvement of our process whereby we employ for leaching a resin bonded batt of glass fibers, we have found the resin does not interfere materially with the leaching and is not disintegrated during leaching so that the batt is not disturbed during leaching, washing, drying, or firing, but preserves its shape. It may, therefore, be handled and subjected to normal mechanical shock in the manipulation and in introduction into the firing oven. The firing operation not only dehydrates the fiber but also burns off the resin, resulting in a batt of clear, transparent, carbonaceous free glass fibers with all the resin burned off. The batt undergoes considerable shrinkage in area and increases in bulk density.

The following examples illustrate the procedure and the results attained:

Example 9

A sample of resin bonded glass fibers taken from a larger batt was treated in the manner similar to the treatment of Example 8. The ignited sample had the same composition as the glass fibers of Example 8.

10.497 grams of the resin bonded fibers were treated with HCl acid solution of 10.6% (113.2 grams of HCl per liter, for 20 minutes at 140° F. with frequent stirring. At the end of the 20 minutes the sample was removed from the solution and washed to neutrality. The final concentration of the HCl after treatment was 10.5% (111.2 grams per liter). The washed sample was air dried at 100° F. to constant weight and weighed 8.069 grams, indicating a loss of 23.1% by weight during treatment.

5.01 grams of the dried sample were heated at 1700° F. for 1 hour and weighed in the same manner as in the previous examples. The dehydrated sample weighed 3.349 grams, showing a weight loss of 33.2%.

On microscopic examination of 10 sample fibers in treatment, after leaching and air drying and after firing, the results were as follows:

|  | Original | Leached, Air dried | Leached, Fired |
|---|---|---|---|
|  | Inch | Inch | Inch |
| Maximum fiber diameter | .00032 | .00031 | .00024 |
| Minimum fiber diameter | .00021 | .00022 | .00022 |
| Average fiber diameter | .00027 | .00027 | .00023 |

The distribution of fiber diameters was as follows:

|  | Original | Leached, Air dried | Leached, Fired |
|---|---|---|---|
|  | Per cent | Per cent | Per cent |
| Below .00019″ | --- | --- | --- |
| Between .0002 and .00026″ | 40 | 50 | 100 |
| Between .00027 and .00031″ | 60 | 50 | --- |

It may be observed that the fired fibers were clear and transparent and were similar to those produced in Example 8.

This again shows some evidence of reduction in fiber diameter on leaching and on firing.

Example 10

Batts of resin bonded fibers were leached with 10% hydrochloric acid (initial concentration) at 140° F. for about 12 hours. 10 batts, each 6′ by 4.5′ and 1″ thickness, were employed. The thickness of the batts was determined by the conventional manner by placing a plate of negligible weight on the batt which rested on a plane surface, and superimposing a one pound weight. The total weight of the batts was 46 pounds. The total superficial area (measured on one side) of the 10 batts was 270 square feet and the bulk density, as determined by the above method of measuring thickness, was 2.04 pounds per cubic foot.

After leaching the batts were washed free of acid and air dried. After air drying the batts had their original form and showed no distortion of shape except a reduction in the superficial area (measured) on one side which showed a reduction in area of 13% to 235 square feet. The average thickness of the batts appeared unchanged. The weight of the batts was 33 pounds.

The air dried batts were fired at 1700° F. for 8 hours. The fired batts were still perfect in form except that the superficial area was reduced to 173 square feet, showing a reduction in area of 36%. The batts had an average thickness of ½″ and a weight of 24 pounds. The bulk density was therefore 3.3#.

The firing thus caused a contraction or shrinkage of the batts. The fibers were clear and white, showing that the resin binder had been substantially completely burned off.

Leaching affects the length of the fiber and may affect the fiber diameter. This appeared in the treatment of woven fibers in Examples 6 and 7 as a reduction in the length and width of the cloth, i. e., reduction in the length of the warp and filling fibers of the cloth and a tighter weave. The same effect is evidenced in the treatment of the batted fibers.

The treatment of the fibers may be carried to completion by prolonged extraction so that the reactions are at apparent equilibrium. The total content of oxides, other than SiO₂, of the leached glass may be less than 5% and as low as 2%.

*Example 11*

Batted resin bonded E fibers, such as employed in the above examples, were extracted with acid of 11.2% initial concentration at a temperature of 140° F. for five hours. The acid leached batt was removed from the acid solution and washed acid free, air dried, and then fired at 1700° F. for 8 hours. The original batt had the following analysis:

Ignition loss at 1250° F., 21%, i. e., resin 21%.
Analysis of the ignited fiber:

| | Per cent |
|---|---|
| Silica (SiO₂) | 53.76 |
| Aluminum oxide (Al₂O₃) | 15.29 |
| Titanium oxide (TiO₂) | 0.08 |
| Iron oxide (Fe₂O₃) | 0.23 |
| Calcium oxide (CaO) | 16.80 |
| Magnesium oxide (MgO) | 5.10 |
| Alkali as sodium oxide (Na₂O) | 0.42 |
| Boric anhydride (B₂O₃) | 6.60 |
| | 98.28 |

The unaccounted for 1.72%, it is believed, includes some uncombusted carbonaceous residue, and perhaps also some undetermined impurities present in the original glass mix and secondary analytical errors.

The air dried batt had the following analysis:
Ignition loss at 1250° F., 53%.
Analysis of ignited sample:

| | Per cent |
|---|---|
| SiO₂ | 91.98 |
| Al₂O₃ | 1.53 |
| TiO₂ | 0.04 |
| Fe₂O₃ | 0.07 |
| CaO | nil |
| MgO | 0.18 |
| Alkali as Na₂O | 0.20 |
| B₂O₃ | 0.14 |
| | 94.12 |

It is believed that of the 5.88% unaccounted for in large part consists of water of hydration not driven off at 1250° F. and perhaps some uncombusted carbonaceous matter and other undetermined impurities.

The air dried material after firing at 1700° F. had on analysis the following composition:
Ignition loss at 1250° F., 1%.
The ignited material had the following composition:

| | Per cent |
|---|---|
| SiO₂ | 95.68 |
| Al₂O₃ | 1.43 |
| TiO₂ | 0.08 |
| Fe₂O₃ | 0.09 |
| CaO | nil |
| MgO | 0.08 |
| Alkali as Na₂O | 0.32 |
| B₂O₃ | nil |
| | 97.68 |

Of the unaccounted for matter, some may be water of hydration, some water of adsorption, and some uncombusted matter, and some undetermined impurities. It will be observed that the ratio of the SiO₂ to the remaining reported glass-forming oxides after extraction is 99%. The material is substantially pure silica. The impurities, however, do tend to give it non-crystalline character in that the material does not have a sharp melting point. It appears to soften at about 2350° F. and has a fusing point in excess of 3000° F.

Batts, fibers, and cloth thus extracted and dried may be used for filters for acid gases or liquids due to their high resistance to acids. The fired material, because of its high softening and fusion point, may be used for insulation at temperatures far in excess of that permissible for the original glass fibers. They have been used with great success in insulation of jet propulsion engines and tail pipes where temperatures of 1200° F. to 2000° F. are attained. In such service the leached and fired batts are formed into blankets and are employed as insulating coating. The batts are subjected to temperatures ranging from 800 to 2000° F. and have given excellent service and insulating performance.

While the above examples have been given as relating to the alumina lime-boro-silicate glass of low alkali content, the process is also applicable to other glasses, usually employed in the making of glass filaments. The leachability, i. e., the time and temperature and acid concentration, may need to be adjusted for each glass to obtain the desired degree of extraction. By so controlling the degree of extraction we may obtain the desired degree of SiO₂ content and therefore softening point and melting point in a manner similar to that described above. Glass filaments as made by the most important producer of filament glass in this country are available commercially in form type E glass as previously described, C glass, which is slowest in leaching, being most resistant to acid. Type T glass is usually employed in thermal insulation, and type F glass is employed in making coarse fibers. These fibers are manufactured in thickness ranging from about .0002″ to .008″ in diameter. Examples of glasses for use in making glass filaments are also given in United States Letters Patent No. 2,394,493, in that case, however, containing also coloring oxides.

The effect of the glass composition upon its leachability by acids is generally well recognized in the case of borosilicate glasses, as described in United States Letters Patent Nos. 2,106,744 and 2,286,275.

In the case of glasses employed in glass filaments the destructive effect of dilute acids, for example, N/100 is also well known, as in United States Letters Patent No. 2,308,857. We prefer to employ for our process the high alumina, high lime glasses, since we have found that they lend themselves particularly well to our process as described above.

The process thus will produce high silica fibers (ranging from 90–98% SiO₂) of diameters ranging as low as .00019 inch and about .007 or .01 inch or larger, depending on the original diameter of the fibers. The fibers are of considerable strength.

The attack by acids upon the glass fibers has generally in the past been recognized as an evil and to cause the destruction of the fibers or a fatal weakening thereof. However, we have found that the leached fibers as produced by our process have sufficient strength for our purpose. We have thus found that if such leached fibers are fired at temperatures of 1500° F. to 2000° F. but below the melting point of the leached glass, and preferably, also, below the softening point of the leached glass, the fibers have sufficient rigidity and strength for practical handling purposes for many uses, particularly for thermal insulation at high temperatures.

By coating the fibers with an acid permeable but acid resistant resin coating, we may overcome the embrittling and other destructive effects of the leaching, and thus improve the process of leaching. After leaching the resin coated fibers may be fired to shrink the fibers and burn off the resin.

The preshrinking of the leached fibers before forming the loose fibers or batts of fibers into insulating blankets or other prefabricated insulating forms, or for use in loose formation as insulation to be placed on the surfaces to be insulated, has the advantage that the glass will not undergo shrinkage when it is installed in service, such as high temperature insulation service where it would be subjected to elevated dehydrating temperature. Such dehydration may result in the formation of steam inside the insulating glass structure to cause blow holes or even disruption of the structure. Additionally, when the resin bonded batts are leached the firing burns off the carbonaceous matter. If the unfired leached batts are employed the high temperature encountered in the insulation service may cause a decomposition of the resin to generate gas which may cause blow holes or otherwise impair the insulating value of the insulating structure or even generate noxious fumes.

For some uses it may be desired to form the insulation into preformed insulating structures or otherwise mount the leached fibers on the insulating wall and heat the insulation to cause it to shrink in place. Provision may be made in the insulating structure to permit the release of the vapors and gases produced by heating to prevent the generation of blow holes.

While for the above purposes it is desirable to shrink the fibers by dehydration at elevated temperatures for a time sufficient to remove substantially all of the water of hydration and all adsorbed water, the acid leached fibers may be merely dehydrated by heating to a temperature of 400–500° F. for a time sufficient to remove water of hydration and adsorbed water without materially shrinking the fibers. The resulting fibers are thus converted into a fibrous silica structure having a high adsorption efficiency for vapors and gases, such as moisture, hydrocarbon vapors, alcohol, acetone and other organic vapors and may be used as a catalyst basis. For this purpose the fibers employed in leaching may be unbonded fibers. If bonded fibers are employed the dehydration process may be operated at a sufficiently elevated temperature to burn off the resin.

While we have described a particular embodiment of our invention for the purpose of illustration, it should be understood that various modifications and adaptations thereof may be made within the spirit of the invention as set forth in the appended claims.

We claim:

1. As an article of manufacture, a leached batt of silica filaments bonded by resin, said filaments containing water of hydration and containing a ratio of $SiO_2$ to other metal oxides in excess of nine.

2. A process of forming batts of silica filaments which comprises, leaching a resin bonded batt of glass filaments with acid to leach out of the glass the glass-forming metal oxides but without leaching any substantial portion of $SiO_2$ or destruction of the resin bonding of said filaments, separating the remaining acid from the batts of leached filaments bonded in batt form by said resin bond, and washing said filaments substantially free of acid, and drying said batt.

3. A process of forming batts of silica filaments which comprises, leaching a resin bonded batt of glass filaments with acid to leach out of the glass the glass-forming metal oxides but without leaching any substantial portion of $SiO_2$ or destruction of the resin bonding of said filaments, separating the remaining acid from the batts of leached filaments bonded in batt form by said resin bond, washing said filaments substantially free of acid, drying said batt, and firing said batt to dehydrate said filaments and burn off said resin.

4. As an article of manufacture, a leached batt of resin coated silica filaments containing a ratio of silica to other metal oxides in excess of nine.

5. As an article of manufacture, leached resin coated fibrous silica containing a ratio of silica to other metal oxides in excess of nine.

6. As an article of manufacture, leached resin coated fibrous silica containing water of hydration and containing a ratio of silica to other metal oxides in excess of nine.

7. A process of forming a filamentary silica material which comprises, leaching a resin coated filamentary glass material with acid to leach out of the glass the glass-forming metal oxides without leaching any substantial portion of the silica content of the glass, separating the remaining acid from the material, washing the material substantially free of acid and drying the material.

8. The process set forth in claim 7 which includes the step of firing the dried material to dehydrate the same and burn off the resin.

9. A porous substantially unwadded dehydrated batt of elongated silica filaments, containing non-silicious metal oxides, the ratio of silica to said metal oxides being in excess of 9, said silica filaments having a melting point in excess of 1950° F.

10. A heat insulating blanket composed of a porous batt of elongated silica filaments containing non-silicious metal oxides, the ratio of silica to said metal oxides being in excess of 9, said silica filaments having a melting point in excess of 1950° F.

11. The article defined in claim 1 in which the resin is a phenolic resin.

12. The article defined in claim 1 in which the resin is a vinyl resin.

13. The article defined in claim 1 in which the resin is methyl methacrylate.

14. The process set forth in claim 3 in which the resin is a phenolic resin.

15. The process set forth in claim 3 in which the resin is a vinyl resin.

16. The process set forth in claim 3 in which the resin is methyl methacrylate.

LEON PARKER.
ALEXANDER COLE.

REFERENCES CITED

The following references are of record in the file of this patent:

UNITED STATES PATENTS

| Number | Name | Date |
| --- | --- | --- |
| 195,889 | Elbers | Oct. 9, 1877 |
| 1,913,242 | McClure | June 6, 1933 |
| 2,184,320 | Simpson | Dec. 26, 1939 |
| 2,261,148 | Ebaugh | Nov. 4, 1941 |
| 2,315,329 | Hood | Mar. 30, 1943 |
| 2,331,944 | Pazsiczky | Oct. 19, 1943 |
| 2,407,483 | Ebaugh | Sept. 10, 1946 |